United States Patent Office 3,174,268
Patented Mar. 23, 1965

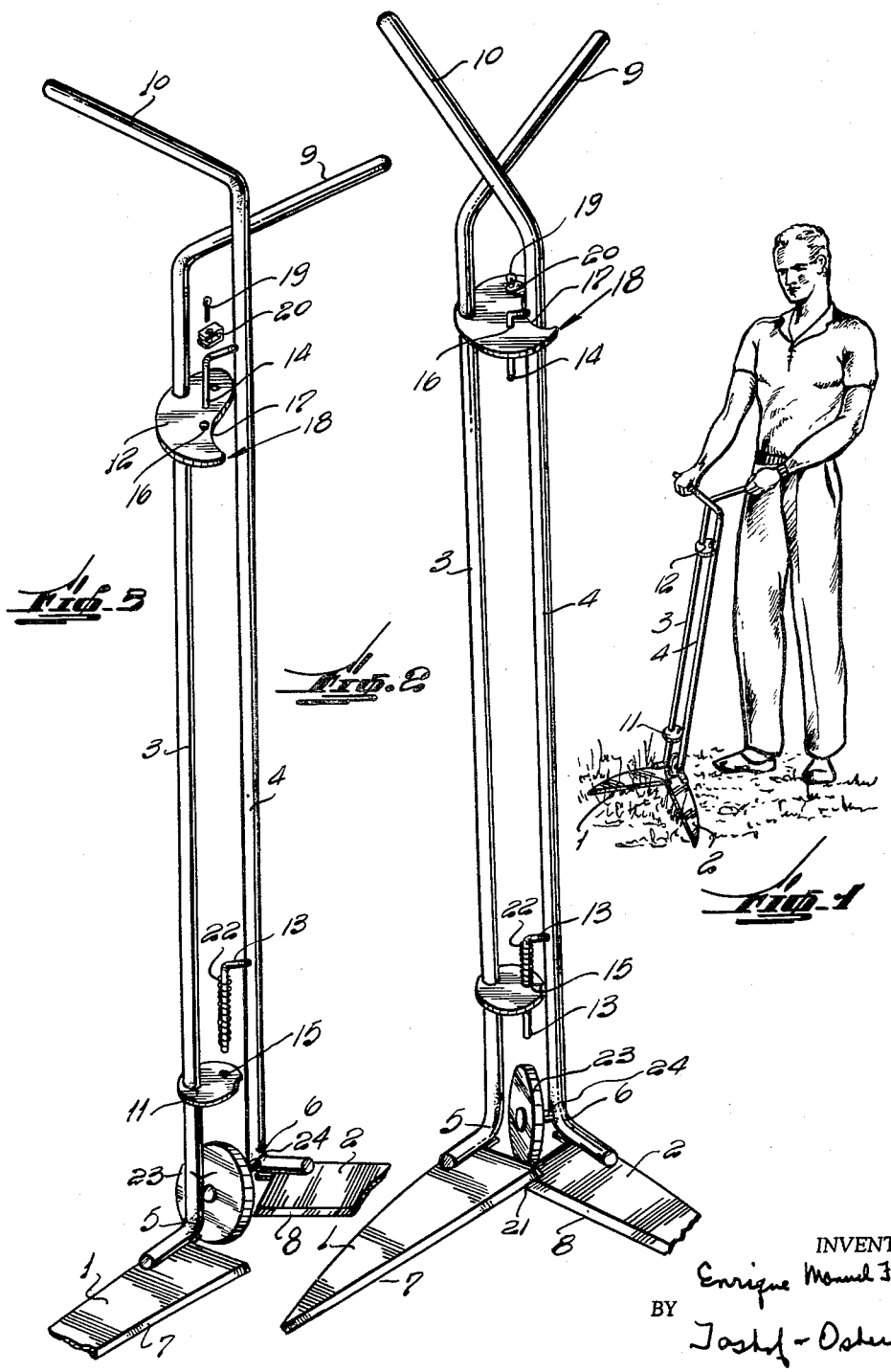

3,174,268
HERBAGE CUTTING DEVICE
Enrique Manuel Fernandez, 4557 Helguera St.,
Buenos Aires, Argentina
Filed Jan. 20, 1964, Ser. No. 338,711
8 Claims. (Cl. 56—241)

This invention refers to a herbage cutting device and more particularly to a hand-driven scissor type grass cutter.

To the present date, all manual grass cutting devices, of the scissor type are tiresome to work with because they do not provide a guide in order to cut the grass to a substantially uniform length, and furthermore, require the operator to bend down or to kneel.

One object of the present invention is to provide a novel scissor-type grass cutter, which overcomes the above drawbacks.

Another object is to provide an easily operable scissor type grass cutter, which can be handled by the operator in upright position.

Another object is to provide a practical grass cutter, which cuts grass at a substantially uniform height, due to special guide means.

A further object is to provide a grass cutter, wherein the operator needs not to be an experienced gardener.

A further object is to provide an easily dismountable scissor type grass cutter.

The grass cutter according to the present invention comprises two blades mounted on a corresponding pair of shafts including respective handles, both shafts being operatively interrelated for relative movement and linked with a rolling wheel.

Both shafts are interrelated in such a way that they permit the correct operation of the cutter, as will be later explained.

The scissor cutter, which is the subject of this invention offers multiple advantages which will be set forth from the following description.

In order to facilitate the comprehension of the present invention, particularly as far as the apparatus is concerned, reference will now be made to a specific embodiment by way of example, in relationship to the accompanying drawings, wherein:

FIGURE 1 shows a grass cutting device in perspective view and how it is possible to operate this device; the operator being in a standing position.

FIGURE 2 is a perspective view of an assembled grass cutting device, and

FIGURE 3 is a perspective view showing how the component parts of the cutter may be separated.

As is illustrated in the figures, the scissor cutter is formed by two cutting elements 1 and 2, rigid with a pair of supporting shafts 3 and 4. The lower end portions of the supporting shafts 3, 4 define each an elbow 5-6 to which the cutters 1 and 2 are rigidly linked, such as by welding, rivetting or the like (not shown).

Both cutting elements 1, 2 include each a cutting surface 7 and 8 facing each other and capable of entering into cutting relationship one with the other.

The upper end portion of each one of shafts 3 and 4 defines a handle 9–10 for actuation of the devices.

A pair of spaced apart plates 11 and 12 are rigidly mounted on shaft 3, and serve as mounting elements for shaft 4.

For this purpose, shaft 4 includes spaced apart spigots 13 and 14 which, when the device is assembled are inserted in corresponding orifices 15 and 16 made in plates 11 and 12, so that both spigots are axially aligned and act as pivots.

Plates 11–12 include bays 17 formed thereon, said bays 17 defining a boss 18 which limits the circular displacement of shaft 4 in one direction.

Furthermore, through the same above mentioned plate 12, a cotter pin 19 is removably inserted, which secures a stop 20 to said plate 12. Stop 20 projects into the path of shaft 4 thereby limiting the rotation of shaft 4 in a direction opposite to that of boss 18, so that cutters 1 and 2 do not fall out of contact. The initial contact point of said cutters 1, 2 being indicated by reference numeral 21 in FIGURE 2. Elements 11, 12, 13, 14, 18, 19, 20 and 22 may therefore be defined as "spring biased hinge means."

A helical compression spring 22 is coiled on spigot 13, and as shown in FIGURE 2 one end of the aforementioned spring 22 abuts against plate 11 thereby providing the necessary force to maintain cutting edges 7 and 8 of cutters 1 and 2 in cutting contact.

The elbow 6 of shaft 4 supports a stub shaft 24 which projects perpendicularly therefrom and on which a rolling wheel 23 is mounted and which serves as a rest for the whole device, so that the operator can run the cutter device along the ground while the cutters 1 and 2 are actuated, at the same time as the cutting height with regard to the ground is kept substantially constant.

As to the operation of the device, the operator moves the cutting device along the ground by means of the wheel 23 at the same time as he operates handles 9 and 10 in a scissor-like manner, whereby shaft 4 will rotate about the axis defined by spigots 13 and 14 and boss 18 defines the maximum closed position of the pair of cutting elements 1 and 2 while stop 20 defines the maximum open position, as shown in FIGURE 2. In other words boss 18 and stop 20 define the maximum operational path of shaft 4.

To dismantle the device of the present invention, such as for sharpening the cutting edges 7 and 8, it is necessary to withdraw in first instance the cotter pin 19 and stop 20, as shown in FIGURE 3, whereby shaft 4 by means of its handle 10 can be further rotated in anti-clockwise direction, so that the cutting elements 1 and 2 become completely separated, whereupon shaft 4 can be moved upwardly and thereby the two main parts are completely disassembled. For reassembling the device, the sequence of steps is followed in reverse order as above explained.

It will be understood that improvements may be introduced into the embodiment described by way of example and modifications may be made in the construction and material employed without departing from the scope of the invention specifically defined in the following claims.

I claim:

1. A herbage cutting device comprising two cutting elements each having a cutting edge, said cutting edges facing each other upon said cutting element being in open position, a pair of supporting shafts, each supporting shaft having an upper end portion and a lower end portion, each upper end portion defining a handle, each lower end portion supporting one of said cutting elements, a pair of plates each having an orifice, one of said shafts rigidly supporting said pair of plates in spaced and aligned relationship, a pair of spaced apart spigots integral with the other of said shafts and pivotally housed in said orifices, and a spring mounted on at least one of said spigots, said spring being capable of maintaining both cutting elements in cutting contact.

2. A herbage cutting device as claimed in claim 1, wherein one of said plates includes at least one boss for limiting the path of said other shaft.

3. A herbage cutting device as claimed in claim 2, wherein a wheel is supported by the lower end portion of one of said shafts.

4. A herbage cutting device as claimed in claim 1, wherein said spring is a helical compression spring having one end abutting against said plate, and the cutting element of the shaft supporting said spigots being thereby urged into cutting contact with the other of said cutting elements.

5. A herbage cutting device as claimed in claim 1 wherein a wheel is rotatably supported by one of said shafts for maintaining said cutting element at a constant height from the ground.

6. A herbage cutting device as claimed in claim 1, wherein said spigots and said orifices of said plates are each axially aligned.

7. A herbage cutting device as claimed in claim 1, wherein said lower end portion of each supporting shaft defines an elbow to which said cutting element is linked.

8. A herbage cutting device as claimed in claim 7, wherein one of said elbows is provided with a stub shaft which projects perpendicularly therefrom, and a wheel being mounted on said stub shaft.

References Cited by the Examiner
UNITED STATES PATENTS

| 1,072,151 | 9/13 | Norcross | 56—241 X |
| 1,410,247 | 3/22 | Griffin | 56—241 |
| 3,057,142 | 10/62 | Berkson | 56—241 |

T. GRAHAM CRAVER, *Primary Examiner.*

RUSSELL R. KINSEY, *Examiner.*